(12) United States Patent
Zuo et al.

(10) Patent No.: US 7,430,097 B2
(45) Date of Patent: Sep. 30, 2008

(54) ACTUATOR WITH FLUID-REDIRECTING AND DRAG-REDUCING SURFACE FEATURES

(75) Inventors: Xu Zuo, Prior Lake, MN (US); Xiaohong Sun, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 426 days.

(21) Appl. No.: 11/169,436

(22) Filed: Jun. 29, 2005

(65) Prior Publication Data

US 2007/0002498 A1    Jan. 4, 2007

(51) Int. Cl.
*G11B 5/55* (2006.01)
(52) U.S. Cl. ....................................................... 360/266
(58) Field of Classification Search .................. 360/266
See application file for complete search history.

(56) References Cited

U.S. PATENT DOCUMENTS

| | | | |
|---|---|---|---|
| 4,473,855 A | 9/1984 | Plotto et al. | |
| 4,650,138 A | 3/1987 | Grose | |
| 4,723,186 A | 2/1988 | Nakajima et al. | |
| 5,386,955 A | 2/1995 | Savill | |
| 5,860,626 A | 1/1999 | Moser | |
| 5,901,928 A | 5/1999 | Raskob, Jr. | |
| 5,973,883 A | 10/1999 | Yanagisawa | |
| 5,999,372 A | 12/1999 | Peterson et al. | |
| 6,193,191 B1 | 2/2001 | Falcimaigne et al. | |
| 6,201,664 B1 | 3/2001 | Le et al. | |
| 6,545,842 B2 | 4/2003 | Rao et al. | |
| 6,788,493 B1 | 9/2004 | Subramaniam et al. | |
| 6,961,219 B2 * | 11/2005 | Asano et al. | 360/266 |

* cited by examiner

*Primary Examiner*—A. J. Heinz
(74) *Attorney, Agent, or Firm*—Fellers, Snider, et al.

(57) ABSTRACT

An actuator assembly is provided comprising a data transfer head moved by an actuator arm in a data storing and retrieving relationship with a data storage medium. Streamwise arranged aerodynamic fluid re-directing and drag-reducing features on a surface of the actuator arm modify frictional forces acting on the arm from a fluid flow created by moving the medium. A method is provided for improving nonrepeatable runout disturbances in a data storage device by aligning the drag-reducing features of the actuator assembly with a direction of a mean flow direction of the fluid at an outer diameter of the storage medium to divert the fluid flow away from the head gimbal assembly.

18 Claims, 9 Drawing Sheets

ACTUATOR WITH FLUID-REDIRECTING AND DRAG-REDUCING SURFACE FEATURES

FIELD OF THE INVENTION

The claimed invention relates generally to the field of windage control in data writing devices and more particularly, but without limitation, to providing fluid-redirecting and drag-reducing surface features on components supporting a head in a data writing relationship with a data storage medium.

BACKGROUND

Data writing devices, such as data storage devices and servo writers, employ actuators to position data heads with extremely abrupt accelerations and high velocities. Also, as performance requirements move the data storage medium faster in relation to the head, the windage created by the moving medium significantly impacts against the actuator as well. Storage densities have dramatically increased while access times have dramatically decreased, making attention paid to resonant performance of the actuator all the more important a part of reliable data transfer.

Many and varied attempts have been made at conditioning windage in relation to the susceptible supporting structure of the head by a suspension assembly extending from a cantilevered actuator arm. In some solutions, upstream strippers and downstream dams attempt to divert turbulent windage away from the head gimbal assembly. In other solutions flow straightening devices have been suggested in attempts to reduce the amount of turbulence near the head gimbal assembly. In yet other solutions complicated shrouding solutions have been suggested to control the turbulent outflow of the windage from a disc stack.

However, as form factors continually shrink, the associated componentry is being miniaturized to the point that there is no room for such windage conditioning devices. What is needed is a solution that involves modifying existing components and yet provides the same or better improvements as the sophisticated devices and arrangements. It is to these improvement features that the embodiments of the present invention are directed.

SUMMARY OF THE INVENTION

Embodiments of the present invention are generally directed to re-directing fluid away from the head gimbal assembly (HGA) and reducing aerodynamic drag on an actuator assembly in a data writing device. For purposes of this description, the term "aerodynamic" refers to both of or either of the fluid re-directing features and the drag-reducing features of the embodiments of the present invention.

In some embodiments an actuator arm is configured for supporting a head gimbal assembly, the arm comprising a surface defining a plurality of substantially parallel fluid stream conditioning grooves disposed in a slanting relation to a longitudinal axis of the arm.

In some embodiments an actuator assembly is provided comprising a data transfer head moved by an actuator arm in a data storing and retrieving relationship with a data storage medium; and streamwise arranged aerodynamic features on a surface of the actuator arm for modifying frictional forces acting on the arm from a fluid flow created by moving the medium.

In some embodiments a method is provided for improving nonrepeatable runout disturbances in a data storage device by aligning the aerodynamic features of the actuator assembly with a direction of a mean flow direction of the fluid at an outer diameter of the storage medium.

In some embodiments a data writing device is provided comprising an actuator assembly in a data transfer relationship with a moving storage medium; and means for modifying a fluid flow boundary layer that is operably created by the storage medium to reduce aerodynamic drag on the actuator assembly.

These and various other features and advantages which characterize the claimed invention will become apparent upon reading the following detailed description and upon reviewing the associated drawings.

DETAILED DESCRIPTION

Figure 1:
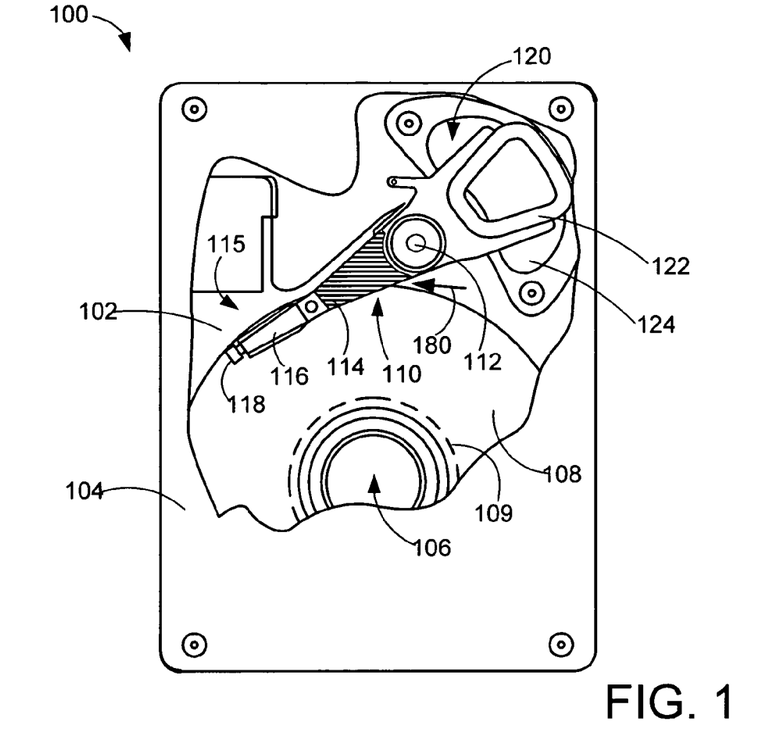
FIG. 1 is a plan view of a data storage device constructed in accordance with embodiments of the present invention.

Turning to the FIGS. as a whole and in particular now to FIG. 1, a data storage device 100 (sometimes referred to as a "data writing device") is constructed in accordance with embodiments of the present invention. The data storage device 100 includes a base 102 and a top cover 104 (shown partially cut away for clarity) that cooperatively form a housing. Components inside the housing include a spindle motor 106 that rotates one or more data storage mediums (sometimes referred to as "discs") 108. Information is written to and read from tracks, as illustrated by broken line 109, on the mediums 108 through the use of an actuator assembly 110, which rotates about a bearing shaft assembly 112 positioned adjacent the mediums 108. The actuator assembly 110 includes a plurality of actuator arms 114 that extend towards the mediums 108, each supporting a head gimbal assembly 115. The head gimbal assembly 115 includes a flexure 116 attached at one end to the actuator arm 114 and supporting, in turn, a head 118 which includes a fluid bearing slider (not shown) enabling the head 118 to fly in close proximity adjacent the corresponding surface of the associated medium 108.

Radial positioning of the heads 118 to a desired track 109 is controlled through the use of a voice coil motor 120. The voice coil motor includes a coil 122 attached to the actuator assembly 110, as well as one or more permanent magnets 124, which establish a magnetic field in which the coil 122 is immersed. The controlled application of current to the coil 122 causes a magnetic interaction between the permanent magnets 124 and the coil 122 so that the coil 122 moves in accordance with the well known Lorentz relationship. As the coil 122 moves, the actuator assembly 110 pivots around the bearing shaft assembly 112 and the heads 118 are caused to move across the surfaces of the discs 108.

Controlled movement and positioning of the heads 118 in relation to the medium 108 surface relies upon servo information (sometimes referred to as "servo pattern") on the medium. The servo pattern provides information that specifies the radial positions of the heads 118, which information can then be compared to the desired head 118 position, allowing for appropriate signals to be sent to move the heads 118 accordingly. There are generally two types of servo pattern used in data storage devices, dedicated servo and embedded servo. Dedicated servo pattern involves dedicating one disc in a stack as containing the servo pattern, whereas embedded servo pattern involves regularly interspacing servo pattern information on a disc where a head following the disc track 109 is intermittently reading the servo pattern while track following. Either type of servo pattern can be recorded onto a target disc by the data storage device 100; this is referred to as "in-situ" servo writing.

Figure 2:
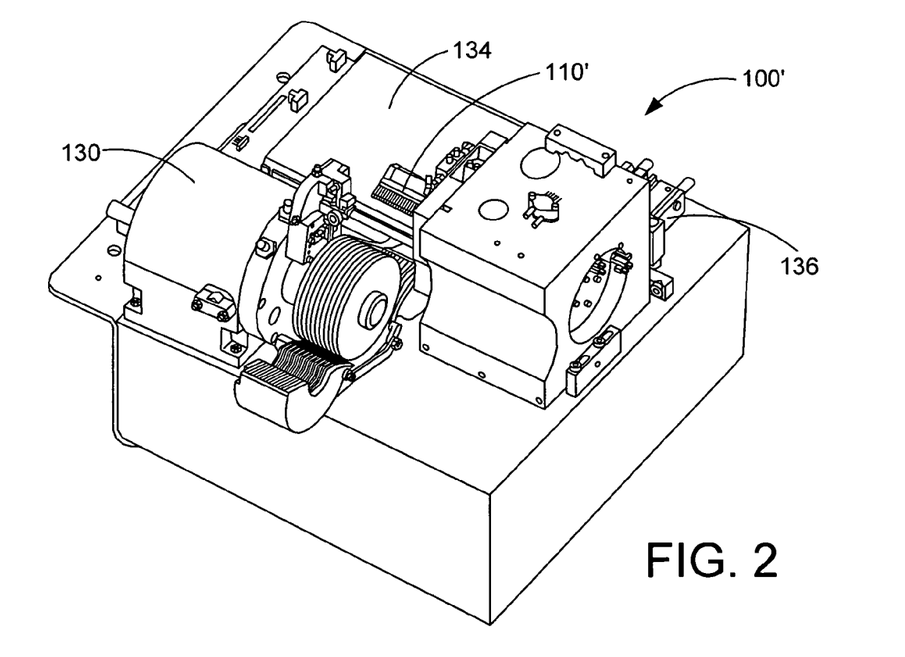
FIG. 2 is an isometric view of a servo track writer constructed in accordance with embodiments of the present invention.
Figure 3:
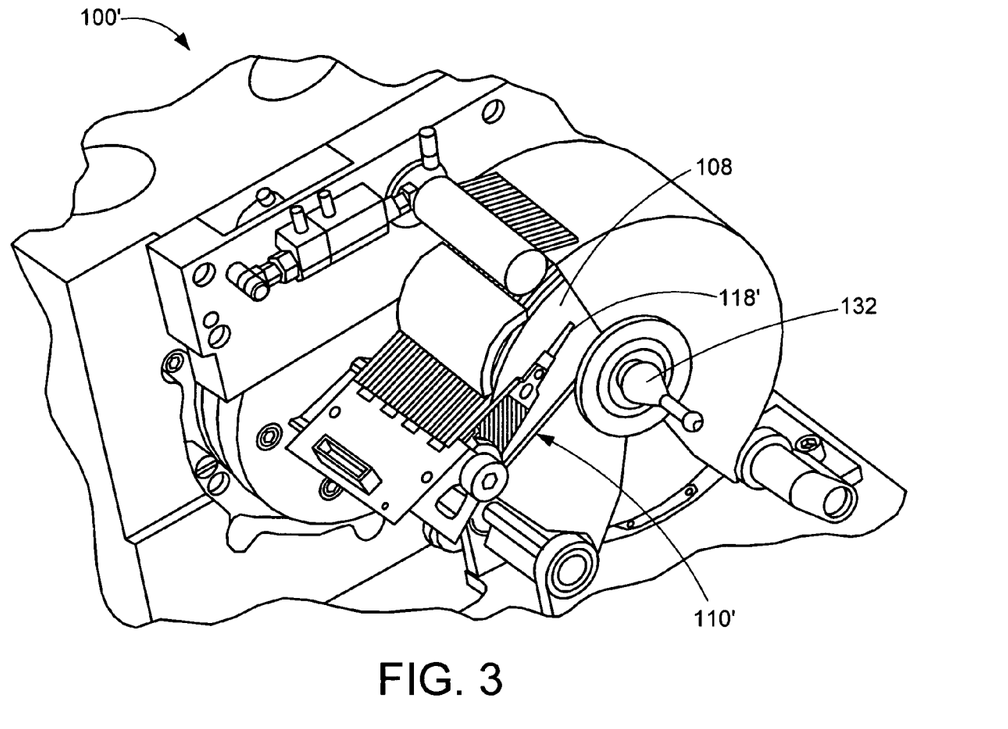
FIG. 3 is an enlarged view of the servo track writer of FIG. 2 showing the actuator engaging the storage medium in a data transfer relationship.

Alternatively, FIG. 2 is an isometric view of a multi-disc servo track writer ("STW") 100' that can be used to write some or all of the servo pattern on the medium 108 before being installed into a data storage device 100. FIGS. 2 and 3 best show that the STW 100' writes data in a similar manner as the data storage device 100, in that an actuator assembly 110' rotates heads 118' in relation to the respective medium 108. A motor 130 receivingly engages a spindle 132 onto which the mediums 108 are stacked and spaced apart, and fixed in rotation therewith. Means for moving and positioning the actuator 110' can include a vacuum chuck 134 for rigidly securing the actuator assembly 110' in a desired position, and a laser interferometer for measuring the angular displacement and consequent positioning of the head 118'.

FIG. 2 illustrates the STW 100' in the load/unload position where the actuator assembly 110' has been moved away from the medium 108 via a slide mechanism 136. In this position, a stack of mediums 108 can be loaded to start the servo writing process. Once the medium 108 stack has been loaded, the actuator assembly 110' is brought to a data transducing position with the medium 108 stack, and the medium 108 stack is rotated. The rotational motion of the medium 108 stack generates fluid flow streams so that the heads 118' ride on a fluid bearing adjacent the respective medium 108 surface.

Figure 4:
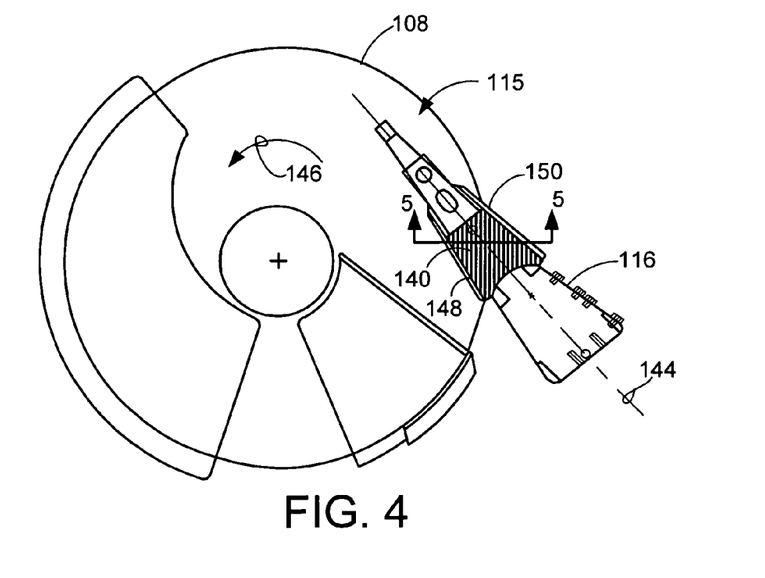
FIG. 4 is a top view of the actuator of FIG. 3.

FIG. 4 is a plan view of the actuator assembly 110' of FIGS. 2 and 3 that is used for further discussion below. The scope of the embodiments of the present invention contemplates practicing the embodiments discussed in equivalent alternative embodiments with regard to the data storage device 100.

Accordingly the base reference numbers, such as 100, 110 and 116, as used below contemplate equivalently the actuator assemblies of either the data storage device 100 or the STW 100'.

Figure 5:
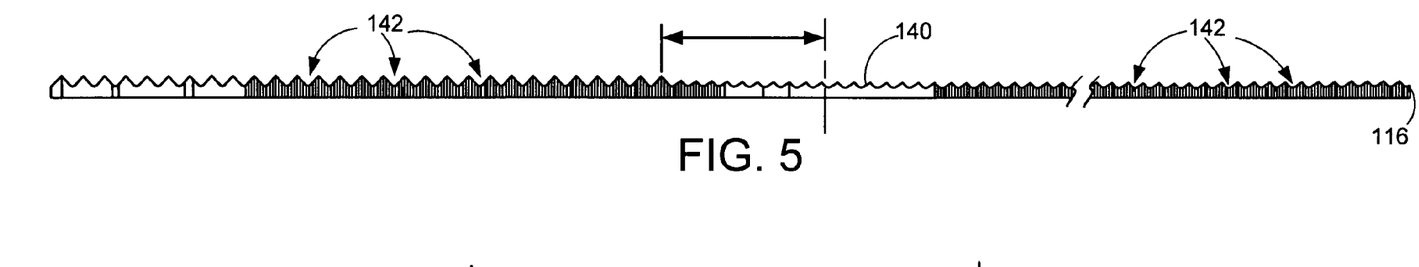
FIG. 5 is a cross sectional view from line 5-5 in FIG. 4.
Figure 6:
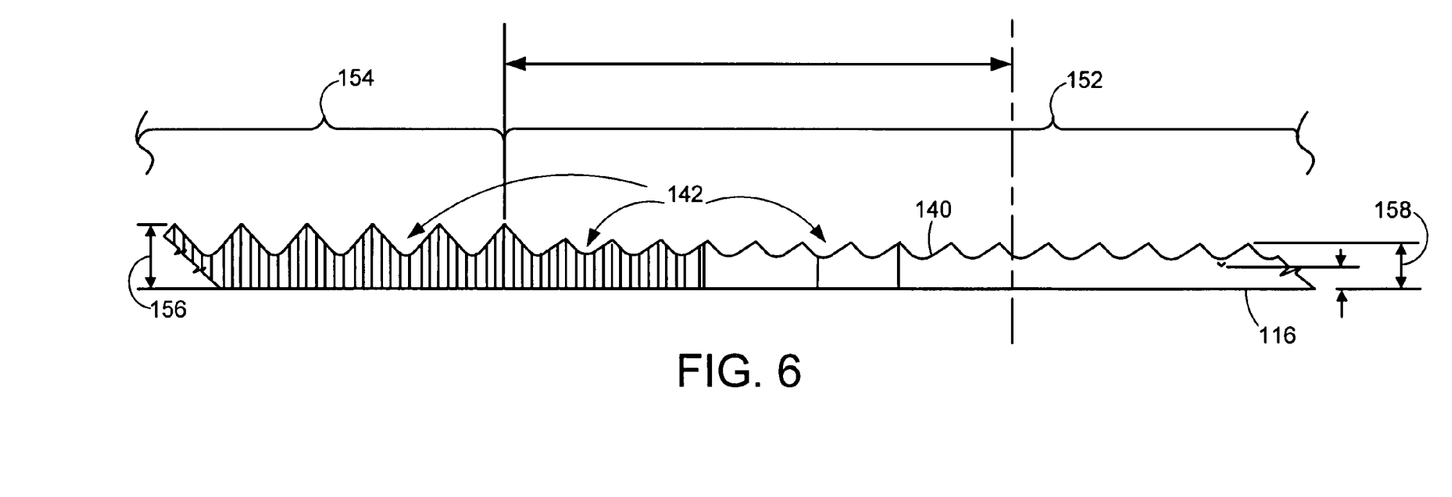
FIG. 6 is an enlarged view of a portion of the cross sectional view of FIG. 5.

FIGS. 4-6 best show that the actuator arm 116 has a surface 140 that defines a plurality of substantially parallel fluid stream conditioning grooves 142. The grooves 142 in the embodiments shown are substantially straight, and are disposed in a slanting relation to a longitudinal axis 144 of the actuator arm 116. In equivalent alternative embodiments the grooves 142 can be curved, or can be a mixed arrangement of straight and curved. The medium 108 is operably rotated in a direction denoted by reference number 146, and thereby frictionally engages fluid surrounding the medium 108 to impart a generally outwardly spiraling fluid flow in the same counterclockwise direction. Each groove 142, more particularly, defines a first end 148 adjacent an upstream side of the actuator arm 116 and a second end 150 adjacent a downstream side of the actuator arm 116. It will be noted that the second end 150 is disposed relatively closer to the end of the arm 116 that is connected to the head gimbal assembly 115.

Figure 7:
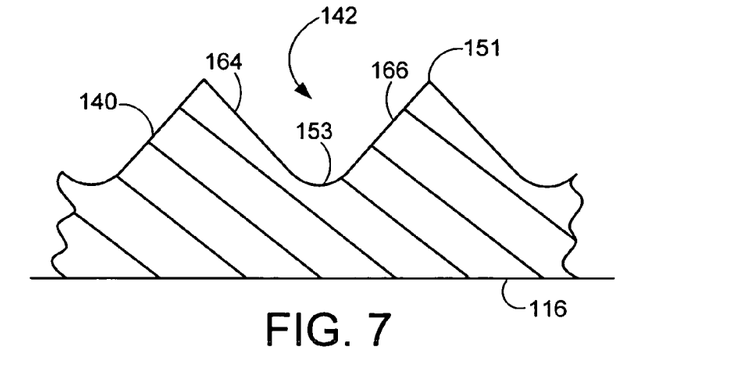
FIG. 7 is an enlarged cross sectional view of the aerodynamic features of the actuator of FIGS. 1 and 3 constructed in accordance with embodiments of the present invention.

The grooves 142 in the embodiments of FIG. 5 define a sharp-tip sawtooth cross sectional profile. FIGS. 6 and 7 are enlarged views of the grooves 142. The sharp tips 151 aid in segmenting the boundary layer fluid flow with respect to a nearest respective groove 142. The projections provided between the tips 151 and the bottoms 153 defining the groove 142 inhibit turbulent eddy motions in the boundary layer from penetrating deep between adjacent projections.

The surface 140 preferably defines a first plurality 152 of the grooves 142 and a second plurality 154 of substantially larger configured grooves. That is, the surface 140 defines a thickness 156 with the second plurality 154 of grooves 142 that is substantially greater than a thickness 158 defined with the first plurality 152 of grooves 142, wherein the thickness of the actuator 116 at the bottom of each groove 142 is substantially constant for both pluralities 152, 154.

Figure 18:
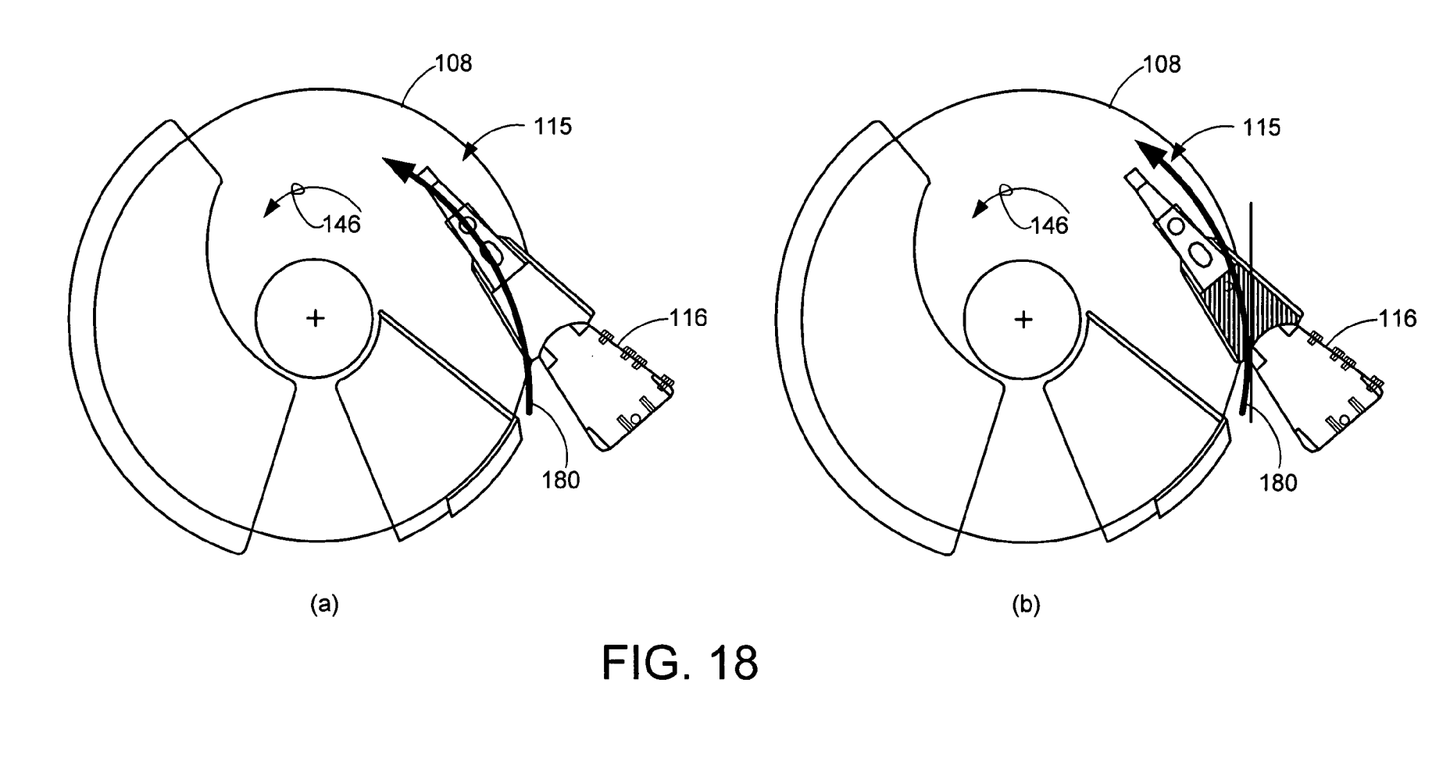
FIG. 18 shows plan views similar to FIG. 3 illustrating the fluid-redirecting advantages of the embodiments herein.

For example, during reduction to practice it was determined that substantial drag-reduction was accomplished with an actuator arm 116 having a first plurality 152 thickness of about ten mills (0.010") and a second plurality 154 thickness of about twelve mills (0.012"), or about a twenty percent increase in groove 142 depth. Sharp tips 151 and bottoms 153 were made with one and two mill radiuses, respectively. The nonparallel characteristic V-groove opposing sides 164, 166 defined substantially a sixty degree angle therebetween. In equivalent alternative embodiments the sides can define a substantially different angle. Also, it will be noted from FIG. 1 that the grooves 142 are preferably aligned with a direction of a mean flow direction of the fluid, designated by reference number 180, at an outer diameter of the storage medium 109. The grooves 142 then re-direct the fluid flow away from the HGA 115 at an outer diameter of the medium 109. FIG. 18 shows plan views similar to FIG. 3 but with and without the aerodynamic features of the embodiments herein. It will be noted that without the aerodynamic features, the fluid mean flow 180 is bent so as to pass over the HGA 115; contrarily, the aerodynamic features serve to re-direct the mean flow 180 so as to not impinge against the HGA 115.

In the illustrated embodiments the first plurality 152 and the second plurality 154 of grooves are each disposed consecutively. The larger second plurality 154 is preferably disposed adjacent the actuator arm 116 distal end, where the head gimbal assembly 115 attaches. The larger second plurality 154 of grooves 142 serves to damp the actuator arm 116 at its distal end, where displacement associated with the cantilevered support is the greatest, and where the actuator arm 116 operates in the presence of turbulent fluid flow being expelled beyond an edge of the medium 108.

Figure 8:
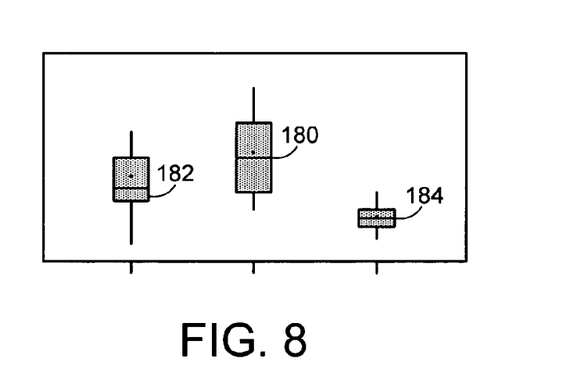
FIG. 8 is a boxplot graphical depiction of test data showing improved performance resulting from practicing the embodiments of the present invention.
Figure 9:
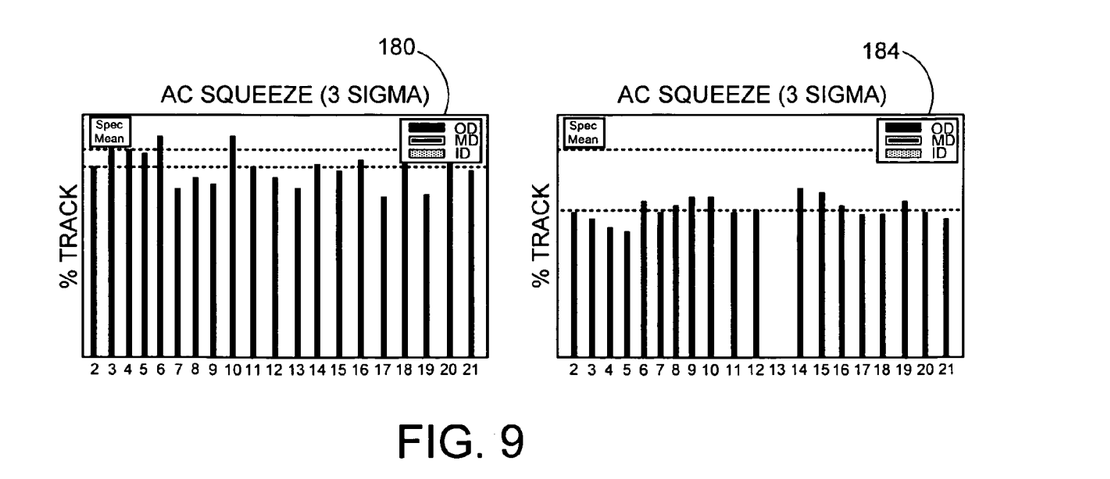
FIG. 9 is a barchart graphical depiction of test data showing improved performance resulting from practicing the embodiments of the present invention.

FIGS. 8 and 9 are graphical representations of measured performance improvement realized by practicing the embodiments described above. FIG. 8 is a box plot from an analysis of variance (ANOVA) study identifying the maximum expected resonance amplitudes within the 6500-8000 Hz range for a standard-configured actuator 180, in comparison to a standard-configured actuator with a damped head gimbal assembly 182, and in comparison to an actuator constructed in accordance with embodiments of the present invention 184. It was concluded that in excess of a 50% improvement was observed by practicing the embodiments herein in comparison to the standard-configured actuator. FIG. 9 is a bar-chart representation of test data results in comparing AC squeeze performance. It was concluded that about a 20% improvement was likewise observed.

Figure 10:
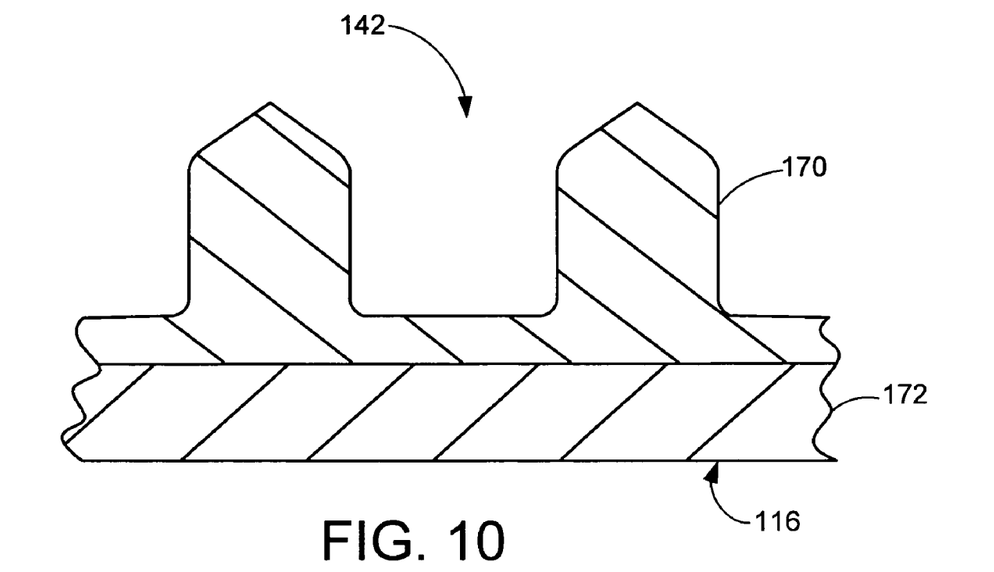
FIGS. 10-17 are enlarged cross sectional views of the aerodynamic features of an actuator of FIGS. 1 and 3 constructed in accordance with alternative embodiments of the present invention.
Figure 11:
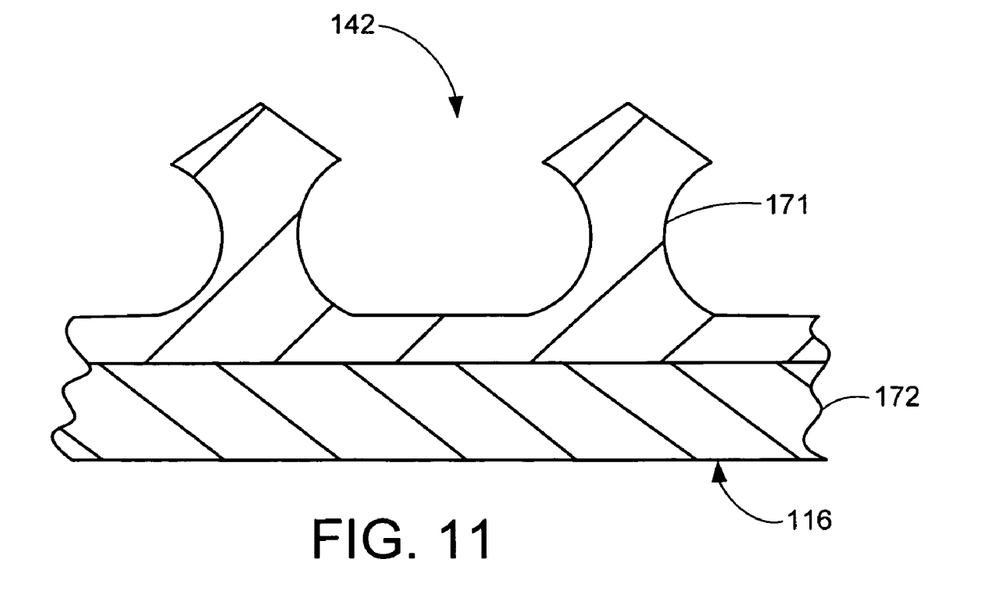
Figure 12:
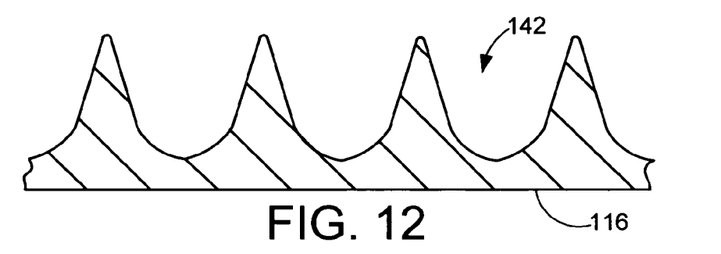
Figure 13:
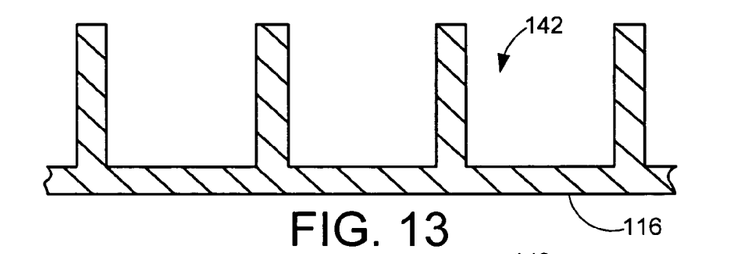
Figure 14:
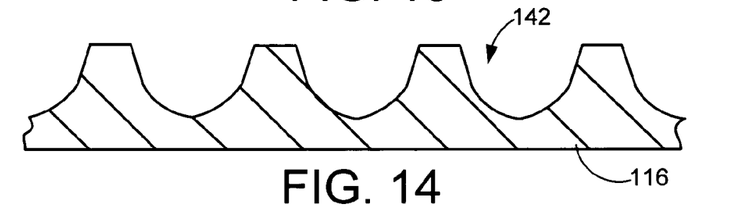
Figure 15:
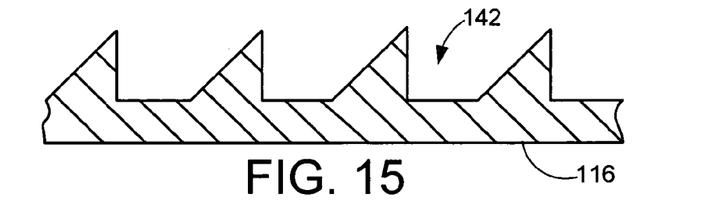
Figure 16:
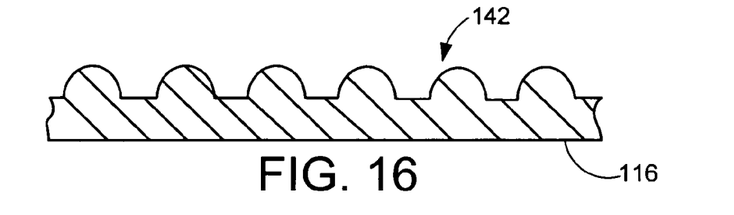
Figure 17:
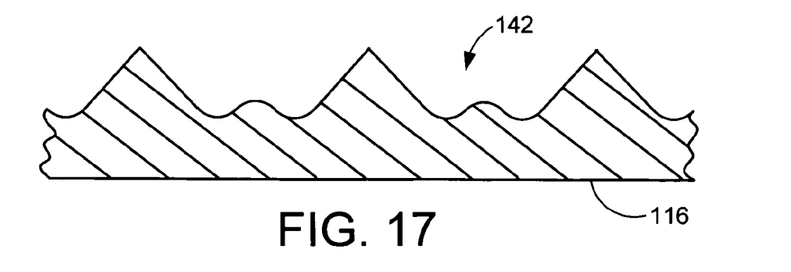

The V-groove configuration of the surface 140, of FIGS. 5-7, lends itself to a relatively efficient construction involving stamping the grooves 142 into the actuator arm 116, such as while parting the actuator arm 16 from blank stock. For more complicated groove 142 designs, such as the vertical sides in FIG. 10 and the catenary sides of FIG. 11, an alternative method of manufacture can be employed by laminating a first member 170 defining the grooves to a support member 172. It has been determined during reduction to practice of the embodiments herein that a suitable material for the first member is a MEMS film manufactured by the Minnesota Manufacturing and Mining Company of St. Paul, Minn. Additional groove configurations are shown in the U-groove, L-groove, Trapezoid-groove, Triangle-groove, and round-groove illustrated in FIGS. 12-16, respectively. FIG. 17 illustrates embodiments wherein adjacent grooves can be differently shaped and/or differently sized.

FIG. 18 illustrates the fluid flow re-directing effects of the grooves. FIG. 18(a) illustrates the fluid flow in a data storage device wherein no groove is defined by or attached to the actuator. In this case the fluid bends so as to flow directly over the head gimbal assembly, and thereby adversely imparts turbulent flow to and around the suspension and head. Alternatively, in FIG. 18(b) the fluid flow is re-directed by the grooves so as to not impinge upon the head gimbal assembly. For clarity, the fluid mean flow direction is shown by straight line 180. The grooves can be angled with respect to the line 180 less than 90 degrees in either a positive or negative direction.

Figure 19:
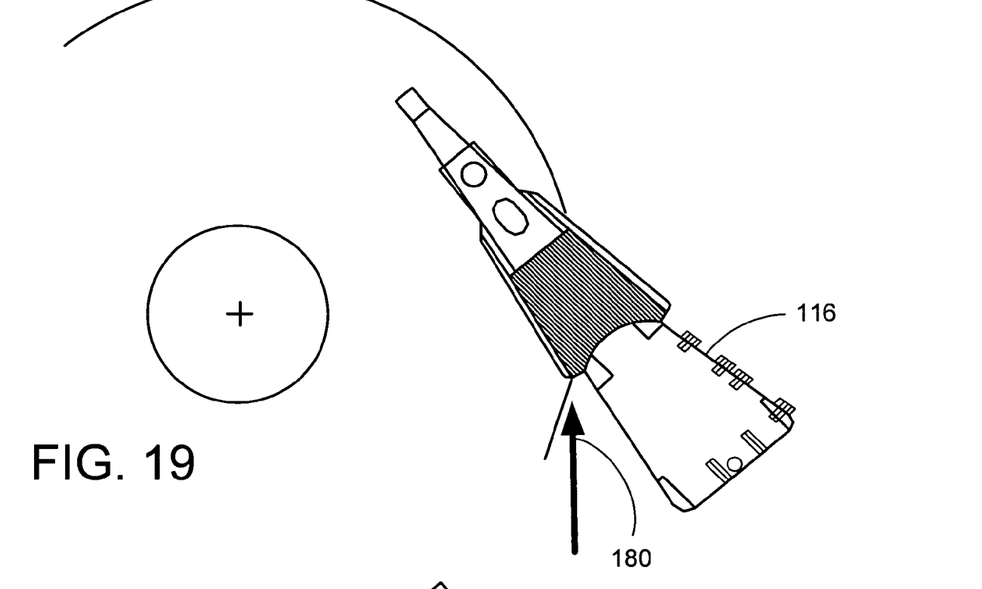
FIG. 19 illustrates grooves that are substantially nonparallel to the fluid mean flow direction in accordance with embodiments of the present invention.
Figure 20:
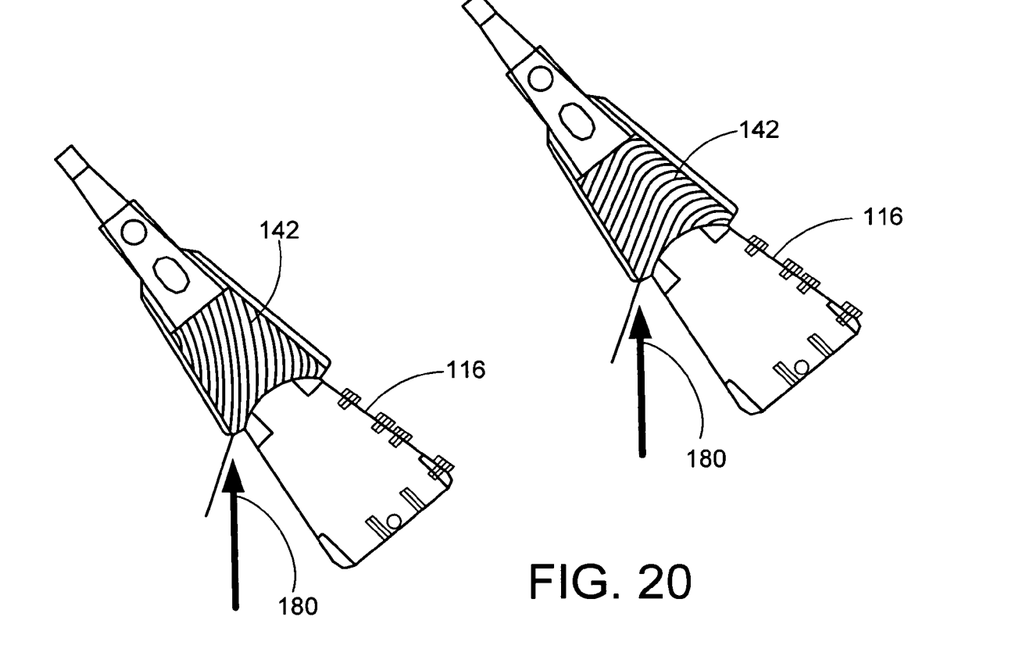
FIG. 20 illustrates grooves that are curved, and other grooves that are partially straight and partially curved.

FIG. 19 illustrates embodiments wherein the grooves are substantially nonparallel to the fluid mean flow direction. The embodiments herein contemplate the grooves disposed longitudinally less than ninety degrees in relation to the fluid mean flow direction. FIG. 20 illustrates embodiments defining longitudinally curved grooves, and FIG. 20 illustrates embodiments defining longitudinally partially straight and partially curved grooves.

Figure 21:
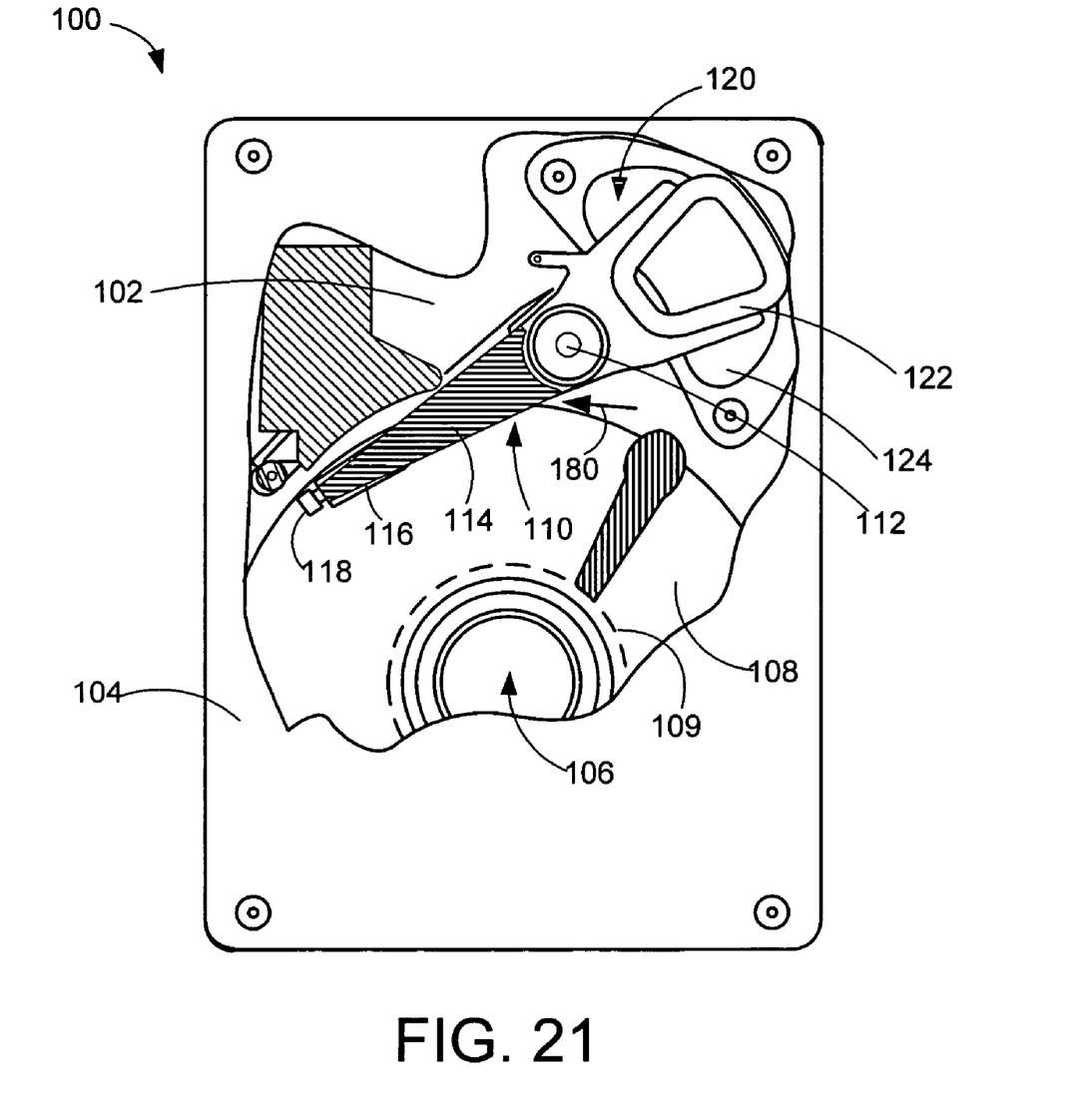
FIG. 21 illustrates grooves defined by an upstream fluid stripper and a downstream fluid dam.

Finally, FIG. 21 illustrates embodiments wherein the aerodynamic surface features can alternatively be defined by the suspension portion of the head gimbal assembly, by an upstream fluid stripper, or by a downstream fluid dam.

Summarizing, the embodiments of the present invention generally contemplate an actuator arm apparatus (such as 116) configured for supporting a head gimbal assembly (such as 115). The actuator arm has a surface (such as 140) defining a plurality of substantially parallel fluid stream conditioning grooves (such as 142) disposed in a slanting relation to a longitudinal axis (such as 144) of the arm.

Each groove defines a first end (such as 148) adjacent an upstream side of the actuator arm and a second end (such as 150) adjacent a downstream side of the actuator arm, wherein the second end is disposed relatively closer to a distal end of the arm that is configured for attachment of the head gimbal assembly.

The longitudinal axis of the grooves can be substantially straight, curved, or mixed. The cross sectional profile can be, for example, V-shaped, L-shaped, U-shaped, trapezoid shaped, or round-shaped. The surface can define a first plurality of grooves and a second plurality of substantially larger grooves where additional damping and additional fluid re-directing effects are needed, such as at the distal end of the cantilevered actuator arm. In some embodiments the grooves can be stamped into the actuator arm, in other embodiments the grooves are laminated to a supporting structure.

Embodiments herein also contemplate an actuator assembly comprising a data transfer head moved by the actuator arm in a data storing and retrieving relationship with a data storage medium; and streamwise arranged aerodynamic features on a surface of the actuator arm for modifying frictional forces acting on the actuator arm from a fluid flow created by moving the medium.

Embodiments herein also contemplate a method of improving nonrepeatable runout disturbances in a data storage device by aligning the aerodynamic features of the actuator assembly with a direction of a flow direction of a fluid at an outer diameter of the storage medium.

Embodiments herein also contemplate a data writing device, comprising an actuator assembly in a data transfer relationship with a moving storage medium; and means for modifying a fluid flow boundary layer that is operably created by the storage medium to redirect the fluid away from the HGA and reduce aerodynamic drag on the actuator assembly. The means for modifying can be characterized by streamwise-directed projections inhibiting turbulent eddy current motions in the boundary layer from penetrating deeply between adjacent projections.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage system, it will be appreciated by those skilled in the art that the claimed subject matter is not so limited and various other processing systems can utilize the embodiments of the present invention without departing from the spirit and scope of the claimed invention.

What is claimed is:

1. An actuator arm apparatus configured for supporting a head gimbal assembly, the arm comprising a surface defining a first plurality and a second plurality of substantially parallel fluid stream conditioning grooves disposed in a slanting relation to a longitudinal axis of the arm, the second plurality of grooves being substantially larger configured grooves.

2. The apparatus of claim 1 wherein each groove defines a first end adjacent an upstream side of the arm and a second end adjacent a downstream side of the arm, wherein the second end is disposed relatively closer to a distal end of the arm that is configured for attachment of the head gimbal assembly.

3. The apparatus of claim 1 wherein a longitudinal axis of the grooves define a characteristic shape selected from a set of shapes consisting of straight, curved, and partially straight and partially curved.

4. The apparatus of claim 1 wherein cross section profiles of the grooves are characterized by a shape selected from a set of shapes consisting of straight, curved, and partially straight and partially curved.

5. The apparatus of claim 1 wherein adjacent grooves define characteristically different sized profiles.

6. The apparatus of claim 2 wherein the first plurality of grooves have a first depth and the second plurality of grooves have a second depth greater than the first depth.

7. The apparatus of claim 1 wherein the first and second plurality of grooves are each disposed consecutively.

8. The apparatus of claim 7 wherein the larger grooves are disposed adjacent the arm distal end.

9. The apparatus of claim 1 wherein the arm is constructed in accordance with a process comprising laminating a first member defining the grooves to a support member.

10. The apparatus of claim 1 wherein the arm is constructed in accordance with a process comprising stamping the grooves in the arm.

11. An actuator assembly, comprising:
 a data transfer head moved by an actuator arm in a data storing and retrieving relationship with a data storage medium; and
 streamwise arranged aerodynamic features on a surface of the actuator arm for modifying frictional forces acting on the arm from a fluid flow created by moving the medium, the aerodynamic features defining a first consecutive plurality of grooves and a second consecutive plurality of substantially larger configured grooves, wherein the second plurality of grooves is disposed adjacent the data transfer head.

12. The assembly of claim 11 wherein the first and second plurality of grooves are disposed in a slanting relation to a longitudinal axis of the actuator arm.

13. The assembly of claim 12 wherein each groove defines a first end adjacent an upstream side of the actuator arm and a second end adjacent a downstream side of the actuator arm, wherein the second end is disposed relatively closer to the data transfer head.

14. The assembly of claim 12 wherein a longitudinal axis of the grooves is disposed in relation to a fluid mean flow direction at an angle that is less than ninety degrees at the first end of each groove.

15. The assembly of claim 11 comprising a suspension defining streamwise arranged aerodynamic features on a surface of the suspension for modifying frictional forces acting on the suspension from a fluid flow created by moving the medium.

16. The assembly of claim 11 wherein the first plurality of grooves have a first depth and the second plurality of grooves have a second depth greater than the first depth.

17. The assembly of claim 11 wherein the actuator arm is constructed in accordance with a process selected from a set consisting of laminating a first member defining the grooves to a second member, and stamping the grooves in the arm.

18. A method of improving nonrepeatable runnout disturbances in a data storage device by aligning the fluid stream conditioning grooves of the actuator assembly of claim 11 with a direction of a mean flow direction of the fluid at an outer diameter of the storage medium to divert the fluid flow away from the head gimbal assembly.

* * * * *